(12) United States Patent
Worger et al.

(10) Patent No.: US 6,553,208 B1
(45) Date of Patent: Apr. 22, 2003

(54) METHODS AND APPARATUS FOR USING GROUND BASED PROCESSING RESOURCES TO SUPPORT ORBITING SATELLITES

(75) Inventors: William Robert Worger, Gilbert, AZ (US); Bradley Robert Schaefer, Chandler, AZ (US); James Powers Redden, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 439 days.

(21) Appl. No.: 09/663,520

(22) Filed: Sep. 15, 2000

(51) Int. Cl.[7] .............................. H04Q 7/34; H04Q 7/20
(52) U.S. Cl. .................... 455/12.1; 455/13.1; 455/427; 455/428; 455/430; 342/357.17; 709/201; 709/202
(58) Field of Search ................................ 455/12.1, 13.1, 455/13.2, 427, 428, 430; 370/389, 498, 532; 342/357.17; 709/201, 202

(56) References Cited

U.S. PATENT DOCUMENTS 6,400,925 B1 * 6/2002 Tirabassi et al. ........... 455/12.1

2002/0031103 A1 * 3/2002 Wiedeman et al. ......... 370/316

* cited by examiner

Primary Examiner—William Trost
Assistant Examiner—Keith Ferguson
(74) Attorney, Agent, or Firm—Frank J. Bogacz

(57) ABSTRACT

A plurality of orbiting satellites (102–112), each comprised of an onboard computer (142). Each of the orbiting satellites and a plurality of ground-based computers (114–124) are utilized to perform delay-insensitive functions associated with the orbiting satellites. An ubiquitous data link (128–138) is maintained between each satellite and one or more of the ground-based computers. The integrated system is configured to allow a satellite to generate a remote procedure call (RPC), transmit the RPC to a ground-based computer, whereupon the ground-based computer processes the RPC and transmits a response back to the satellite. Delay-sensitive tasks and functions are performed by the computer onboard the satellite; delay-insensitive tasks are advantageously performed by the ground-based computer assets.

5 Claims, 1 Drawing Sheet

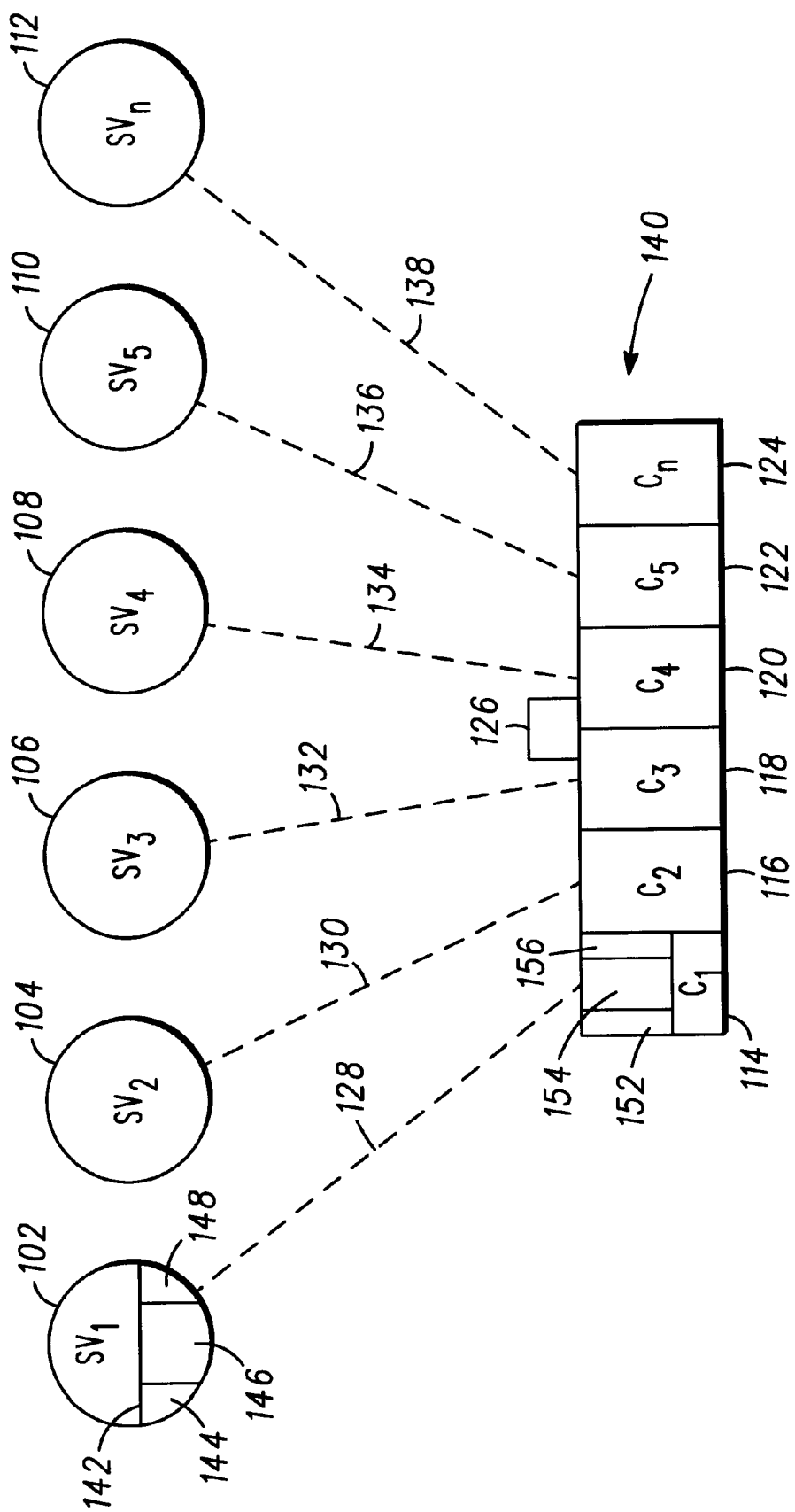

METHODS AND APPARATUS FOR USING GROUND BASED PROCESSING RESOURCES TO SUPPORT ORBITING SATELLITES

BACKGROUND OF THE INVENTION

1. Technical Field

The present invention relates, generally, to data processing techniques for use in the context of an orbiting satellite system and, more particularly, to the use of ground based computers to perform delay insensitive processing functions for the orbiting satellites, while allowing the orbiting satellites to perform delay sensitive processing functions using computing resources onboard the satellites.

2. Background Art and Technical Problems

Presently known satellite systems, for example, satellite systems used to support cellular telephone and other consumer communication systems, strive to maximize the onboard processing capability of each satellite. In this regard, it is important that all flight-critical and mission-critical functions be performed onboard the satellite, for example, in the event the communication link between the satellite and an earth-based computer becomes disrupted. As the processing demands for orbiting satellites continues to increase, the ability to equip orbiting satellites with sufficient processing and memory capability can become prohibitively expensive inasmuch as the onboard computing resources greatly increase the cost of design, transportation, launch, and maintenance of the satellite. In particular, the mass of the computing resources translates to significant costs in terms of launching and maintaining such resources in orbit.

A system and method are thus needed which accommodate the need of an orbiting satellite to provide onboard processing capability for delay-sensitive functions, while at the same time, minimize the cost associated with the onboard computing payload.

BRIEF DESCRIPTION OF THE DRAWING FIGURE

The subject invention will hereinafter be described in conjunction with the appended drawing FIGURE, wherein the referenced numerals in the drawing FIGURE correspond to the associated descriptions provided below and wherein the drawing FIGURE is a schematic block diagram representation of a satellite communication system in accordance with the present invention, illustrating a plurality of satellites, a plurality of ground-based computers, and a plurality of communication links extending between the individual satellites and the bank of ground-based computers.

DETAILED DESCRIPTION OF THE DRAWING

Referring now to the drawing FIGURE, a plurality of satellites, 102, 104, . . . 112, each having an onboard computer 142 is illustrated. To simplify the drawing FIGURE, only satellite 102 is illustrated as having an onboard computer 142, it being understood that one or more of the other satellites 104–112 may also be similarly equipped with an onboard computer 142.

Each respective onboard computer 142, preferably includes a first processor 144, a first memory 146, and a first transceiver 148. First processor 144 may comprise, for example, a Power PC memory element manufactured by Motorola of Schaumburg, Ill. Computer memory 146, may comprise any suitable memory element which may also be available from Motorola. Transceiver 148 is configured to perform the function of transmitting data to and receiving data from ground-based computers as discussed below.

A bank of ground-based computers 140 suitably comprises a plurality of computers 114, 116 . . . 124, each comprising a second processor 152, a second memory 156, and a second data transceiver 154. Second processor 152, second processor 156, and second transceiver 154 may comprise a parts similar to those discussed above in connection with the first processors and the first transceivers.

In a preferred embodiment, each respective satellite 102–112 is associated with a particular one of ground-based computers 114–124. For example, transceiver 148 of satellite 102 is suitably configured to communicate with transceiver 154 of computer 114 through a communications link 128; similarly, satellite 104 is configured to communicate with computer 116 through a communications link (also referred to as a data link) 130, and so on. In an alternate embodiment, each of the respective satellites 102–112 may be configured to communicate with one or more of the ground-based computers which comprise computer bank 140 by way of a multiplexor 126. In this way, multiplexor 126 may be configured to dynamically allocate data links between a particular satellite and a particular ground-based computer based on, inter alia, the then current processing of the various ground-based computers in order to distribute the processing needs in an efficient manner.

Presently known satellite communications systems have recognized the utility of using ground-based computers to perform calculations, algorithms, and other data processing functions, and to upload data packets from the ground-based computer to the orbiting satellite. In contrast, in the satellite communications system of the present invention, ground-based computers 114–124 are under the control of respective computers 142 associated with the satellites. In this way, the orbiting satellite may send a remote procedure call (RPC) to one or more of ground-based computers 114–124, whereupon the ground-based computer asset processes the RPC and uploads to the satellite a response to the RPC, all under the control of the orbiting satellite. In accordance with the present invention, it is desirable to configure the onboard and ground-based computers such that an onboard computer can issue an RPC to a ground-based computer in a manner which is substantially transparent to the onboard computer; that is, the software run on the onboard and ground-based computers advantageously share a common architecture, allowing remote procedure calls to be transmitted to earth, and for the RPCs to be responded to seamlessly. This process may be performed automatically, i.e., without the need for any human intervention.

In accordance with the present invention, the automatic generation of RPCs by a computer 142 may occur periodically, for example, once every second, once every thirty seconds, or the like, depending on the criticality of the function associated with the RPC. In an alternate embodiment to the present invention, certain RPCs may be generated by computer 142 and transmitted to ground-based computer bank 140 on an interrupt or as needed basis.

The satellite communications system of the present invention allows flight critical or mission critical (also referred to as delay sensitive) tasks and computing functions to be performed by onboard computer 142; tasks which are not flight critical or mission critical (referred to as delay insensitive tasks) may be conveniently performed by ground-based computer bank 140 without compromising flight objectives. When determining whether a particular computing task or function is to be performed by an onboard computer 142 or a ground-based computer 114–124, the designer should bear in mind the fact that the data link between the satellite and a ground-based computer may be temporarily interrupted (e.g., due to transient failure of an onboard or ground-based computer component); during any disruption of the communication link between the satellite and the ground-based computer, the satellite must continue to perform certain functions autonomously, such as altitude adjustment, propulsion control, antenna pointing, and other flight control and flight safety functions. Accordingly, these type functions should preferably be performed by the onboard computer. Those computing tasks and functions which are less time sensitive, for example, error checking, non-flight critical inventory management, accumulation of historical flight data and the like, may be advantageously performed by a ground-based computer and uploaded to the satellite, either periodically or on an as needed basis.

Those skilled in the art will appreciate that whether a particular task or function is to be performed on an onboard computer or on an earth-based computer, depends in part on the processing speed and transmission speed with which a ground-based computer can prepare and upload a response to an RPC. In the satellite communications system of the present invention, data rates on the order of gigabytes per second, and particularly, up to 100 gigabytes per second and most preferably about 50 gigabytes per second are employed, with the delay between the satellite and ground system being on the order of milliseconds. Thus, even for tasks which are delay insensitive and, hence, those tasks which can be performed by ground-based computers, the various processors and transceivers of the present invention are suitably configured to allow the transmission of an RPC or the processing of a response and the uploading of that response to a satellite within a period in the range of 50 to 500 milliseconds and most preferably in the range of 100 milliseconds.

It can thus be seen that a high band width, low delay, ubiquitous data link in accordance with the present invention allows satellites in low earth orbit, geocentric earth orbit, or virtually any other flight path to leverage ground-based computing assets without compromising mission goals.

What is claimed is:

1. A satellite communications system, comprising:

a plurality of earth-orbiting satellites, each having an onboard computer, wherein each said onboard computer includes a first processor, a first memory, and a first data transceiver;

a plurality of ground-based computers, each having a second processor, a second memory, and second data transceiver;

wherein each said first data transceiver is configured to communicate with at least one said second data transceiver to thereby form a high data rate, low latency data link;

wherein each said first processor is configured to automatically generate a remote procedure call (RPC), and each said first data transceiver is configured to automatically transmit an RPC to one said second data transceiver, whereupon one said second processor processes said RPC and generates a response to said RPC; and wherein one said second transceiver is configured to upload said response to one of said onboard computer.

2. The satellite communications system of claim 1, wherein each said first processor and each said second processor are configured to execute respective software applications which share a common architecture.

3. The satellite communications system of claim 1, wherein each said first processor is configured to periodically generate RPCs at substantially regular intervals.

4. The satellite communications system of claim 1, wherein a particular one of said plurality of ground-based computers is dedicated to processing RPCs for a unique one of said satellites.

5. The satellite communications systems of claim 1, further comprising a multiplexor, and wherein RPCs generated by each of said plurality of satellites are routed by said multiplexor to one of said plurality of ground-based computers in accordance with a then current processing capacity of said plurality of ground-based computers.

\* \* \* \* \*